June 7, 1960 C. W. MARTIN 2,939,921

MAGNETIC RECORDING MECHANISM FOR SELECTIVE SKEW RECORDING

Original Filed July 5, 1955 5 Sheets-Sheet 1

INVENTOR

Clarence W. Martin

INVENTOR
Clarence W. Martin

INVENTOR
Clarence W. Martin

INVENTOR
Clarence W. Martin

INVENTOR
Clarence W. Martin

United States Patent Office
2,939,921
Patented June 7, 1960

2,939,921

MAGNETIC RECORDING MECHANISM FOR SELECTIVE SKEW RECORDING

Clarence W. Martin, Walnut Creek, Calif., assignor to Marchant Research, Inc., a corporation of California Original application July 5, 1955, Ser. No. 519,778. Divided and this application Jan. 24, 1958, Ser. No. 710,935

1 Claim. (Cl. 179—100.2)

The invention relates to magnetic recording devices and more particularly concerns means for recording a multiple of signals, or channels, on a single track of magnetic tape, or other magnetic medium. This case is a division of patent application Serial No. 519,778 filed July 5, 1955.

The most common type of magnetic recording comprises the recording of a single channel on a single track. This method of recording possesses the following disadvantages: (1) because information is recorded serially from one end of the magnetic tape to the other, access to a particular information area can be obtained only by moving the magnetic medium long distances; (2) if it is desired to simultaneously record two separate pieces of information in parallel and then synchronize these two pieces into a single recording or play-back, difficulty is encountered in obtaining optimum synchronization; and (3) considerable storage and operating space is required for single channel—single track recordings.

One type of magnetic recording which overcomes some of the disadvantages of the single channel—single track type is that in which a plurality of recordings are made in parallel channels on a single tape. In so doing, however, other disadvantages arise: (1) a greater width of tape is required which in turn, requires more operating and storage space for the record; and (2) the greater width of tape also requires a particular size of reel which varies with the number of tracks recorded.

The invention disclosed herein overcomes these difficulties by providing novel means which permit a plurality of channels to be superimposed upon each other on a single track. Such recording is made possible by providing a single head, adjustable different discrete angles, for recording a plurality of channels on a single track. It has been found that any one channel may be played back through the use of a reading head set at an angle which matches that used during recording and that the playback is accomplished with negligible interference from the other recordings.

It has been found that by recording the first channel at a level below saturation, and recording successive channels at the same or progressively lower levels, the successively recorded channels do not cancel out the previous channels at the point of intersection of the signals. Furthermore, cross-talk between channels is reduced to an insignificant level since the point of intersection of the signals is much smaller in area than the remaining magnitized area of any one signal.

Other advantages of packing a plurality of channels on a single track are as follows: it permits the use of an ordinary size of reel, head, and tape, none of which need to be different for recording a variable number of channels; because the number of channels recorded is not dependent on the tape width, the associated apparatus can be small, although the information capacity is many times greater; and the space needed for operating and storing the record is very much reduced over any of prior types of recording.

The structure disclosed herein comprises means for reading superimposed channels of recording from the same track. Control means are provided for automatically switching from one superimposed channel to the next. These control means comprise control signals which reverse the direction of tape movement past the head and also angularly reorient the transducer each time a control signal is sensed.

It is therefore an object of the invention to provide an improved magnetic recording apparatus.

It is a further object to reduce the length of tape required for recording a given amount of information.

A further object is to automatically move a transducer to successive angular positions relative to the direction of tape movement in response to discrete signals on the tape.

An additional object is to record control signals on a tape and operate control mechanism to cause the automatic reversal of the direction of tape travel and the angular reorientations of the transducer in response to sensing these control signals.

In order that the invention may be practiced by others it will be described in terms of an express embodiment, given by way of example only, and with reference to the accompanying drawings in which.

Figure 2:
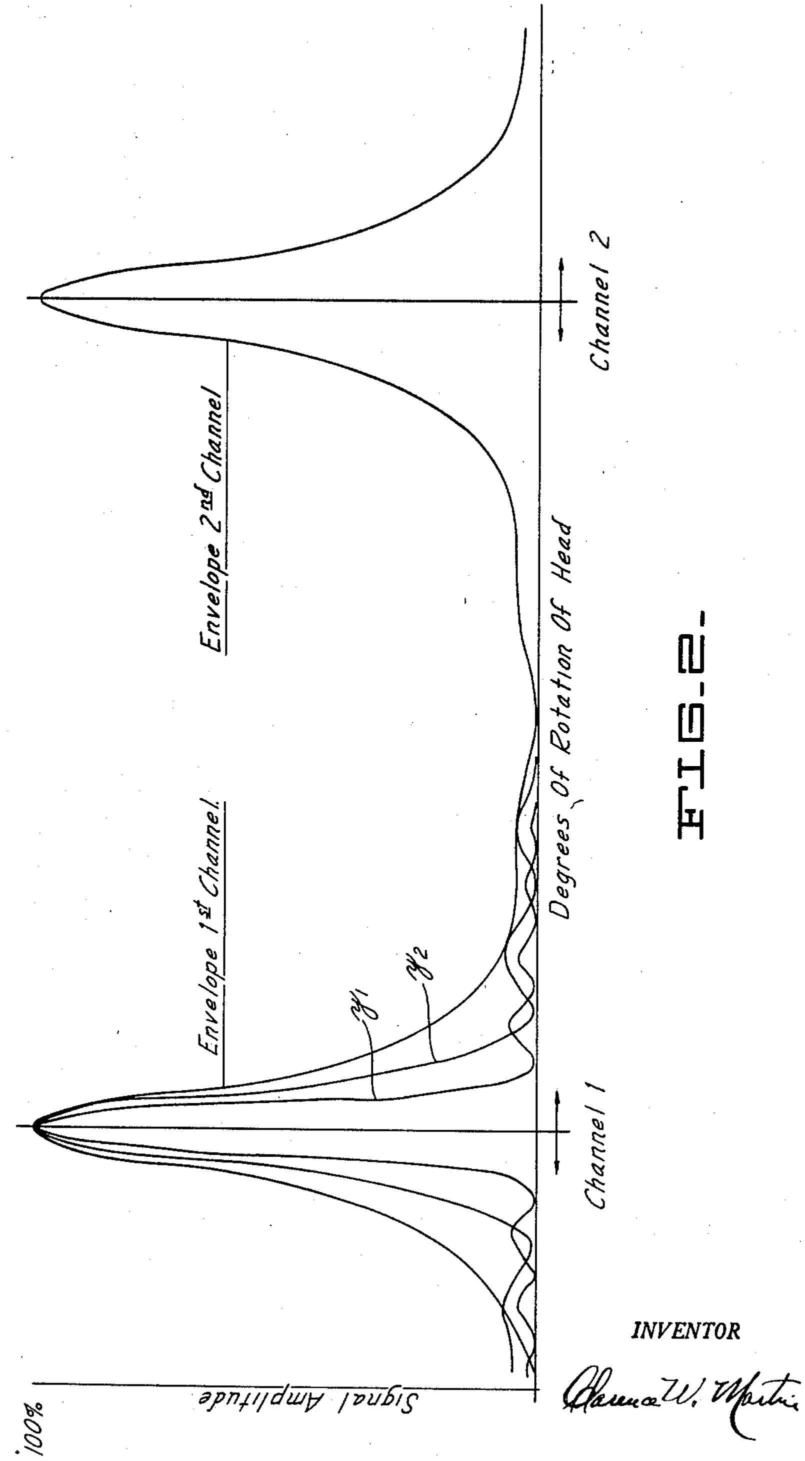

Fig. 2 schematically illustrates the shape of the response curves resulting from rotating a playback head to discrete angles in either direction from a reference recording position.

Figure 3A:
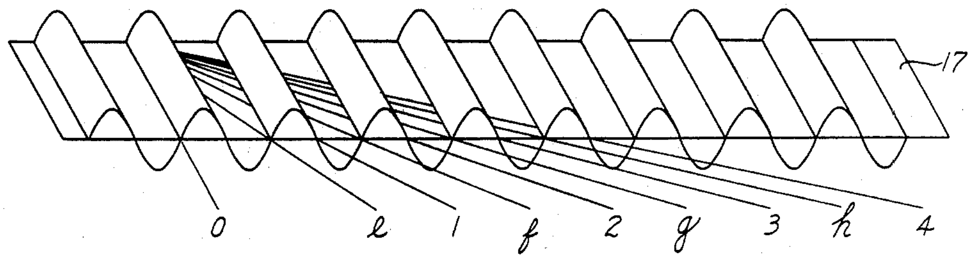

Fig. 3A is a space plot of magnetization intensity along a magnetized tape in relation to selected angular positions of a playback head.

Figure 3B:
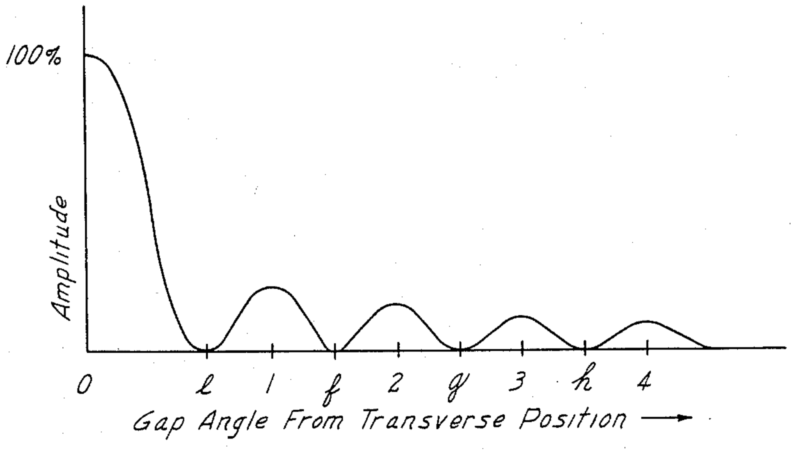

Fig. 3B correlates the amplitude variations in a response curve with the position of a playback head and the space plot of tape magnetization intensity.

Figure 4:
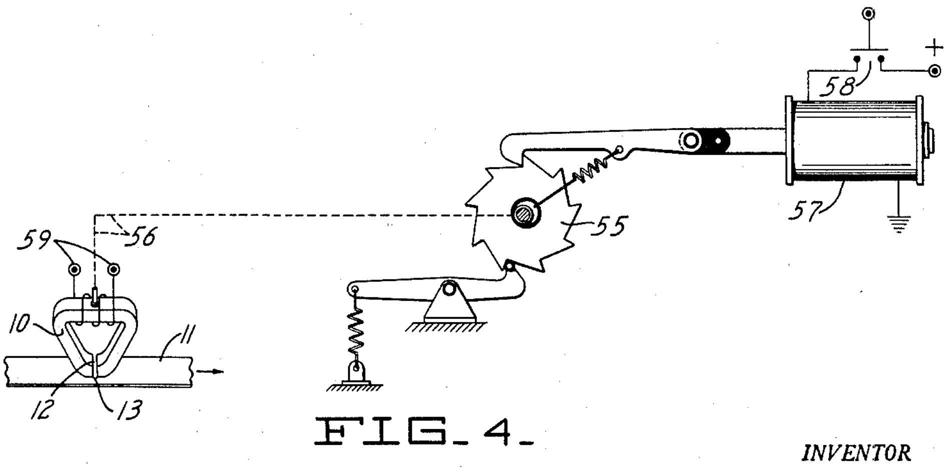

Fig. 4 is a schematic illustration of the transducer positioning mechanism.

Figure 5:
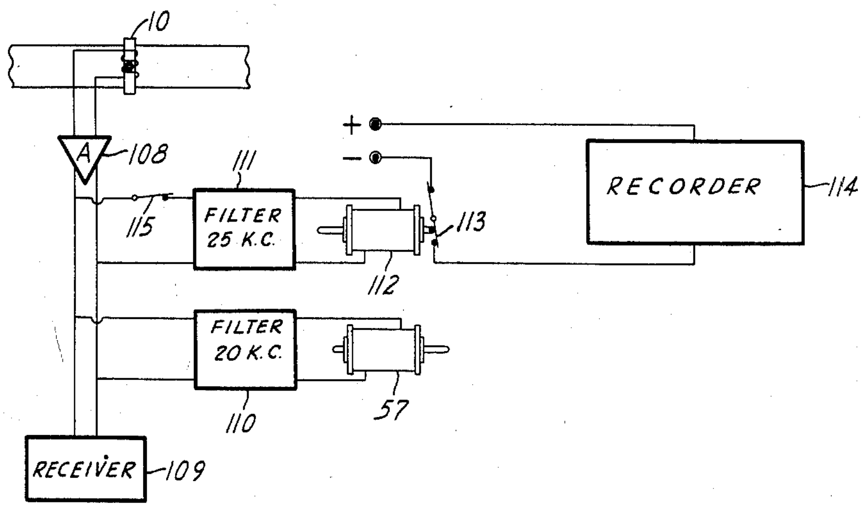

Fig. 5 schematically illustrates the channel control structure employing a single transducer head.

Figure 6:
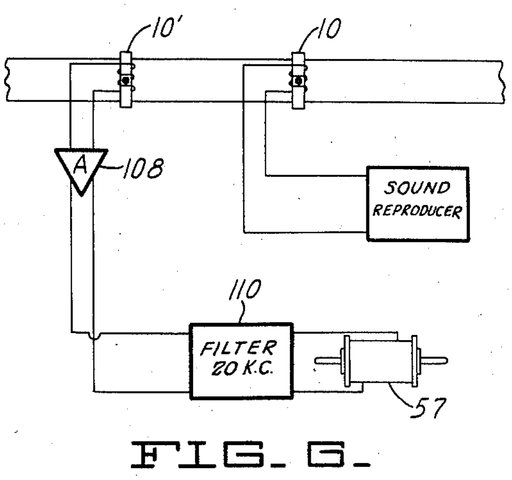

Fig. 6 schematically illustrates the channel control structure employing two heads.

Figure 7:
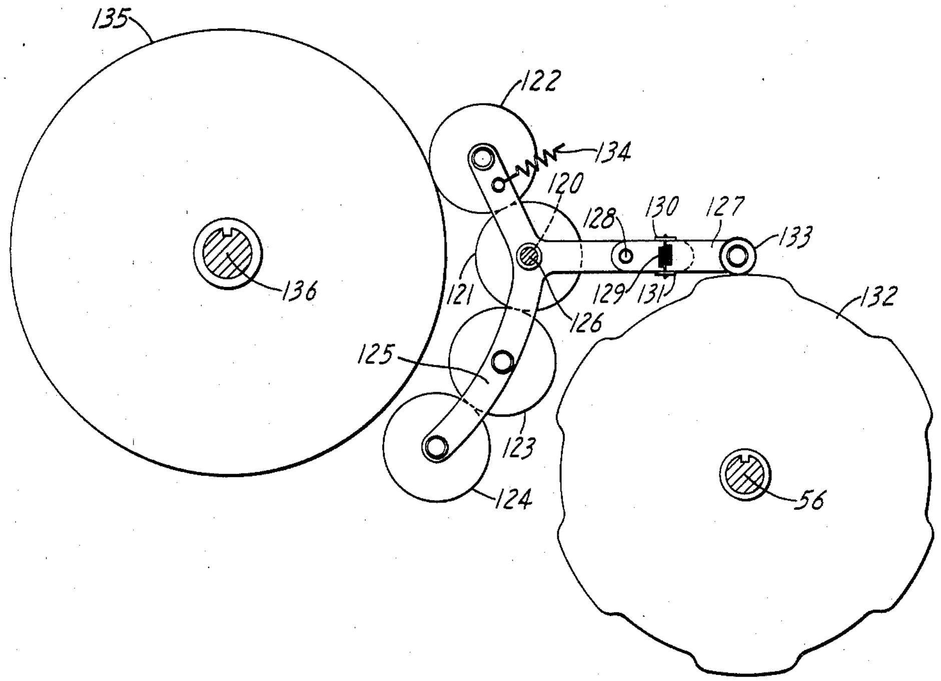

Fig. 7 schematically illustrates a reversible drive for the tape transport mechanism.

*Multiple channel recording*

To illustrate the recording and playback of multiple channels on a single tape track, reference is made to a single recording head 10 such as shown in Fig. 4 having a core gap 12, and pole face 13. The head may be angularly adjusted to different discrete positions relative to the tape 11, in which the head is enabled to record information in correspondingly different channels on the tape. To reproduce the information, the head is set at the recording angle corresponding to the angle used when originally recording the channel containing the information desired. It has been found that in recording digital values for use in computers, a difference of as little as 9° in head position permits reproduction of the particular information on one channel to the substantial exclusion of all other information on the track.

Figure 1A:
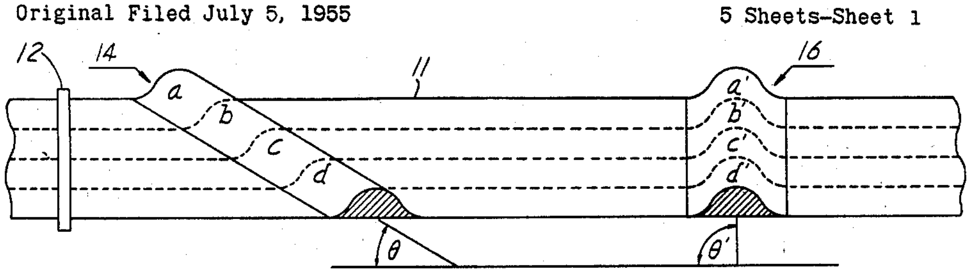
Fig. 1A is a diagrammatic representation of magnetized tape.
Figure 1B:
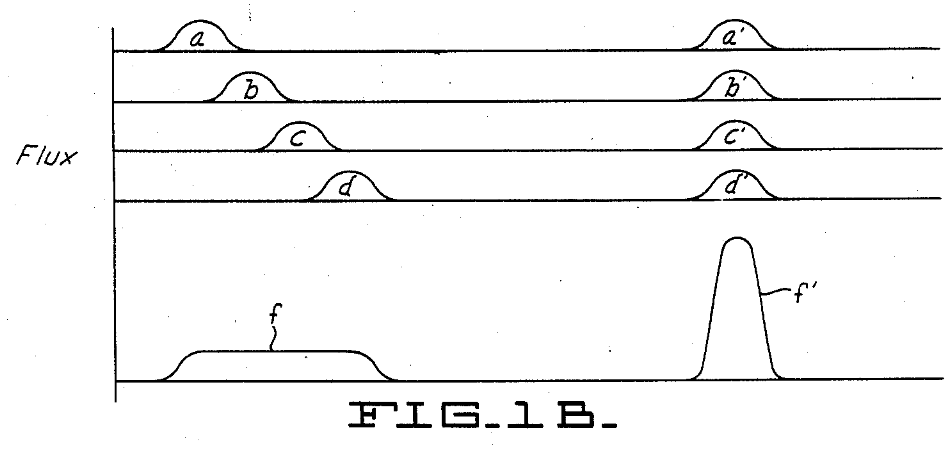
Fig. 1B is a representation of the magnetization of the tape shown in Fig. 1A.
Figure 1C:
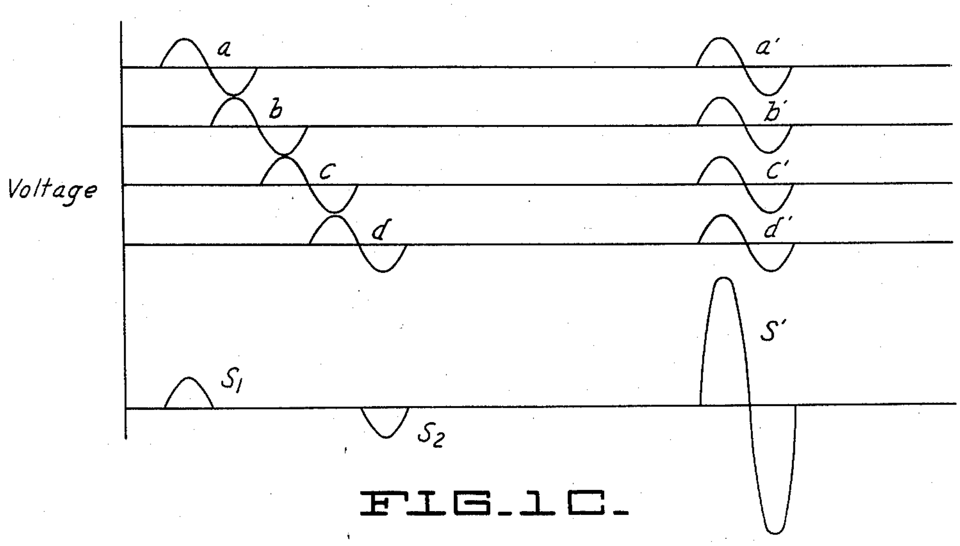
Fig. 1C is a representation of the voltage developed as a result of the magnetization shown in Fig. 1B.

Selected information is reproduced with only negligible interference as is shown by reference to Figs. 1A, 1B, 1C. A first signal represented as 14, Fig. 1A, is recorded on a tape 11 at an angle $\theta$ with the tape. A second signal represented as 16 is recorded at an angle $\theta'$ with the tape. For purpose of illustration, each signal may be divided into four magnetized segments *a, b, c, d,* and *a', b', c', d',* respectively. These segments may be thought of as quantities of flux which are represented in Fig. 1B by corresponding reference letters. As the tape 11 (Fig. 1A) moves to the left, the flux segment "*a*" first moves underneath the gap 12 and then the flux segment "*b*" moves underneath the gap, etc. It will be noted that there are points in the progression of the tape where portions of two adjoining segments, *a, b,* for example, will both be under the gap at the same time. Similarly portions of *b, c* and *c, d* will be under the gap at the same time. Therefore, the flux presented to the gap at any one time comprises at least one and possibly two portions of the segments. The sum of the flux from which the signal is derived, is represented as *f* and *f'* in Fig. 1B. The voltage induced into the transducer from each signal is represented in Fig. 1C; fluxes *a, b, c, d,* and *a', b', c', d'* (Fig. 1C) are differentials of *a, b, c, d,* and *a', b', c', d'* (Fig. 1B) respectively. If these differentials are added in a vertical column, all of the voltages of *a, b, c, d,* cancel each other except $S_1$, the leading portion of segment *a*, and $S_2$, the trailing portion of segment *d*; however, the voltages of the signal 16 comprising segments *a', b', c', d',* add together to make a large signal S'. The same result may be obtained by simply differentiating *f*, Fig. 1B, to get $S_1$ and $S_2$, Fig. 1C, and similarly differentiating *f'*, Fig. 1B, to get S', Fig. 1C.

From the above analysis, it can be seen that a plurality of signals may be superimposed on tape by setting the transducer air gap at various selected angles with respect to the tape and that any respective signal can be reproduced to the exclusion of the other signals.

In the illustration described above, the tape was divided into only four segments and, therefore, the relationship of the distortion produced at $S_1$ and $S_2$ (Fig. 1C) is proportionately larger than is actually the case since each magnetized portion 14 is comprised of thousands of segments depending upon the characteristics of the tape used.

The number of channels that can be recorded on a single track depends only on the tape speed and the recording frequencies. The relationship between channel angles, length of the magnetized wave on the tape, and response amplitude is illustrated in Fig. 2. Assume that information has been recorded on a tape by a single recording head which stands in a fixed position designated as channel 1; then with the reproducing transducer held in precisely the same angle as the recording transducer, the response signal amplitude is the greatest, and is arbitrarily designated as 100 percent. As the reproducing transducer is rotated from channel 1 position, the signal response for any one frequency is similar to $y_1$ or $y_2$; and for a given range of frequencies $y_1$ to $y_2$, the response forms an envelope as indicated. It is seen that as the head is rotated, the signal falls off to such a degree that it is possible to determine the point at which a second channel may be established. Such a channel, designated as channel 2 causes only negligible interference with respect to channel 1.

To explain the valleys and peaks, shown in Fig. 2, reference is made to Figs. 3A and 3B. Fig. 3A represents a variation of magnetization on a magnetic tape. The magnetization is caused by an alternating flux across the gap of recording transducer as the tape moves past the gap with the pole faces of the gap being parallel to line 0. Fig. 3A is merely a representation of the direction and magnitude of magnetization of the magnetizable film on the tape to enable a visualization of the phenomenon. Reference plane 17 may be thought of as the magnetizable film. Lines 0 to 4 and lines *e* to *h* are drawn at angles which simulate different angles of the heads, and such position of the heads would produce respective signals corresponding to the peaks and valleys shown in Fig. 3B, which peaks and valleys are a function of the recorded wave length.

A playback head is rotated through the angles 0 to 4 and the resulting response curve shown in Fig. 3B is plotted as a function of the head rotation. The lines 0, 1, 2, 3, 4 and *e, f, g, h* should be imagined as vertical cuts through the waves, the cuts being perpendicular to plane 17. The resulting sections are representative of the magnitude and direction of the magnetization at any point along the corresponding lines, and this representation of magnetization is presented to the gap of a playback head if it is placed at the angle of the section. Lines 0, 1, 2, 3, 4 (Fig. 3A) are representative of the position of the playback head when the valleys (Fig. 3B) are produced. The response at 0 is 100 percent, since this is the recording position. As the playback head is rotated to line *e*, the response curve decreases from a maximum value to zero. The reason for the decrease in response is illustrated in Fig. 3A. In discussing Fig. 3A, it should be remembered that to produce a response voltage in the playback head, a changing flux is necessary. By looking along line *e* (Fig. 3A) it can be seen that the flux is changing in two directions and that the changes in each direction are equal. The voltages resulting from these opposite changes are of opposite polarity and therefore cancel, causing a valley *e* (Fig. 3B). As the playback head is rotated further, the response increases to a smaller peak 1. Again, to clarify the explanation, reference is made to Fig. 3A; by following along line 1, it will be observed that there is a net change in the direction, the peak response at 1. As the playback head is further rotated, valleys and peaks of diminishing value are produced, the peaks diminishing because the peak net flux decreases as the angle increases.

When recording only one frequency in each of the separate channels, it can be seen from the above discussion that obvious advantages result by establishing the additional channels at the valleys of the response curves.

To record and playback superimposed multiple channels on a single track, any of three types of structures can be used: (1) a single rotatable head to record and to playback information in the various channels; (2) fixed heads to record and to playback information in the respective channels; (3) fixed heads to record and a rotatable head to playback, or a rotatable head to record and fixed heads to playback. The rotatable and fixed transducing heads shown in the embodiments may be of any convenient available type, e.g., the type disclosed in the patent application Serial Number 297,441, filed July 7, 1952, by George B. Greene. The head should be suitably modified for adaptation to the desired tape width.

*General description*

The embodiment of the invention, disclosed herein, includes structure for recording a plurality of superimposed channels of recording on the same magnetic tape or similar medium and comprises a control means for switching from one superimposed channel to the next. The control means includes structure for sensing discrete magnetically recorded frequencies; means for reversing the tape drive, and repositioning the head in response to the sensing of such recorded frequencies.

The discrete frequencies are recorded at each end of the tape or similar medium and control the reversing of the direction of tape movement as described hereinafter.

*Channel selection*

A structure for positioning a transducer head 10 to any one of a plurality of selectable discrete positions or channels is shown in Fig. 4. This structure may be used either for recording or playback of audio recordings allowing a selection of programs in the various superimposed recorded channels, or permitting one long program progressing from one channel to the next.

The head 10 is rigidly attached to a ratchet gear 55 by a shaft designated as 56. The ratchet and attached head are rotated to successive channel positions by pulsing solenoid 57 through the closure of switch 58. Information may be fed into the head through leads 59 and recorded in the particular channel defined by the discrete position of the ratchet and head. The head is maintained in the selected position by any suitable detent cooperating with the ratchet.

To playback information from a particular channel, the head is turned by pulsing solenoid 57 until head 10 is rotated to the angle defining the channel which contains the desired information. The information output is obtained at leads 59.

*Control mechanism*

Mechanism for automatically reversing the tape and for rotating the head one increment for each such reversal is schematically illustrated in Fig. 5. A single rotatable head 10 is provided which transmits a signal through an amplifier 108 to a receiver 109. The signal is also transmitted through two respective filters 110 and 111 to a pair of solenoids 57 and 112. Solenoid 57 operates the channel selection structure of Fig. 4. Filter 110 passes a signal above the audio range, for example in the order of 20 kc., and filter 111 passes only signals in the order of 25 kc.

It will be observed that when automatic tape direction reversing means are employed, the number of discrete head positions must be an even number so that when the head makes a complete revolution, and returns to its initial position, the tape then will be running past the head in the same direction as it previously did on the first pass of the tape by the head.

If an even number of head positions are provided, then recordings can be made on the tape only during the first 180° of rotation of the head; however, the head may be rotated through a full 360° during playback with the second 180° repeating the playback of the first 180°. Furthermore, it should be noted that the head must be stepped through an even number of positions during each 180° of rotation of the head, so the tape will be passing under the recording head in the same direction for each respective head position in both 180° phases of operation. For this reason, the discrete number of positions of the head may be any multiple of four within the capacity of the head to resolve the separate signals. In the present example, the head is rotated to twelve discrete positions, and therefore, it will be assumed that the ratchet 55 (Fig. 4), in this case, has twelve teeth.

Assuming that the head 10 is capable of being rotated to twelve discrete positions, then six signals of 20 kc. are recorded at discrete angles at each end of the tape, one discrete signal for each position of the head. Thus, a single head may be used both for sound reproduction, and for initiating the operation of solenoid 57 to advance the head to its next angular position, and to reverse the direction of the tape movement.

A single 25 kc. signal is recorded at a position on the tape corresponding to the sixth position of the head which signal energizes solenoid 112 and throws a toggle switch 113 to open position, thus opening the circuit of the entire recording unit 114 when the reproduction of six recordings is completed. A separate manually operable switch 115 is provided for disabling the solenoid 112 either when restarting the unit or when continuous and repeated operation of the recording unit is required.

An alternate form of this embodiment is shown in Fig. 6 in which two separate heads 10 and 10' are provided. These heads are stepped in unison from one position to the next in the same manner as described for the single head 10 in Fig. 5. In Fig. 6, the head 10 is used for sound reproduction and head 10' is used solely for operation of solenoid 57. In Fig. 6, the automatic stopping means has been omitted but obviously may be used as disclosed in connection with Fig. 5, or a third head may be provided for this purpose.

The arrangement shown in Fig. 6 permits the heads to be constructed for the optimum response to frequencies desired. Also, in the foregoing description of the embodiment shown in Fig. 6, the head 10 was described as being a reproducing head. It will be apparent, however, that the head 10 may also be used as a recording head if tape is used upon which the proper high frequency signals have been previously recorded on the ends of the tape, and the head 10' is used as a reproducing head. In the present case, only six recordings are possible.

A reversing mechanism for driving the tape in opposite directions is shown in Fig. 7. A shaft 120 is suitably fixed in the framework of the machine and is driven by a motor (not shown). A friction drive wheel 121 is fixed on shaft 120 and drives the idlers 122 and 123 in the same direction. Idler 124 is driven by idler 123 in the opposite direction as idler 122. The idlers 122, 123, and 124 are carried by a three-armed bellcrank 125, freely mounted on a pivot 126 which is coaxial with shaft 120. A follower arm 127 is freely mounted at 128 to the rightmost arm of bellcrank 125 and a spring 129 connected between respective ears 130 and 131 on the follower and the bellcrank normally causes the bellcrank and the follower to act as an integral unit.

A cam 132 is fixed on the previously described shaft 56 (Fig. 4), and is advanced one-twelfth of a revolution each time the tape reaches its end of travel and the solenoid 57 is energized. Such advance of the cam 132 (Fig. 7) alternately moves the high and low peripheries of cam 132 under the follower roller 133. When a low periphery is moved under the roller, a spring 134 rocks the bellcrank 125 in a clockwise direction thus moving wheel 122 out of driving contact with a wheel 135, and moving wheel 124 into contact with the wheel 135. Wheel 135 is fixed on a shaft 136 which transmits a reversible drive to a conventional tape transport mechanism.

When the cam 132 is again advanced, the bellcrank 125 is moved back to the position shown against the tension of spring 134, spring 129 being stronger than spring 134. Spring 129, however, may yield temporarily if the cam 132 should cause slight overthrow of the bellcrank 125. With this arrangement, the direction of movement of the tape is automatically reversed every time this solenoid is energized, such reversal also being accompanied by an automatic angular advance of the head 10 (Fig. 4) as previously described.

The structure is described as recording on tape, however, it will be apparent to those skilled in the art, that similar structures such as magnetic drums could be used in other types of magnetic recording in which case it would be necessary to modify the face of the transducer to conform to the curvature of the drum; the invention is equally well applied to a magnetic disc, card, or the like, and in the claim, the term magnetic medium is used to apply to any form of magnetizable material which is capable of recording a signal in response to the operation of a magnetic recording head.

The invention claimed is:

A signal reproducer comprising: a magnetic medium having groups of signals each within a respective one of two ranges of frequencies recorded thereon, a reproducing head mounted for movement to a plurality of discrete angular positions relative to the plane of movement of the medium past the head, mechanism for rotating the head from one to another discrete position thereof, means for moving the magnetic medium past the head for reproducing said signals, mechanism for reversing the direction of operation of the moving means, a discriminating means coupled to said head and operable to transmit a respective one of the two frequency ranges of said reproduced signals, and mechanism operable in response to a signal transmitted by the discriminating means to initiate the operation of the head rotating mechanism and the reversing mechanism.

References Cited in the file of this patent

UNITED STATES PATENTS

| | | |
|---|---|---|
| 2,514,578 | Heller et al. | July 11, 1950 |
| 2,552,788 | Hoover | May 15, 1951 |
| 2,702,315 | Roderick | Feb. 15, 1955 |
| 2,712,572 | Roberts | July 5, 1955 |
| 2,751,439 | Burton | June 19, 1956 |

FOREIGN PATENTS

| | | |
|---|---|---|
| 174,220 | Austria | Mar. 10, 1953 |